April 1, 1924.

G. E. SANDBLOM

APPARATUS FOR THE REMOVAL OF RUST

Filed Nov. 6, 1922

1,489,157

Inventor.
G. E. Sandblom

Patented Apr. 1, 1924.

1,489,157

UNITED STATES PATENT OFFICE.

GIDEON EFRAIM SANDBLOM, OF FARJENAS, GOTTENBORG, SWEDEN.

APPARATUS FOR THE REMOVAL OF RUST.

Application filed November 6, 1922. Serial No. 599,375.

*To all whom it may concern:*

Be it known that I, GIDEON EFRAIM SANDBLOM, a subject of the King of Sweden, residing at Farjenas, Gottenborg, in the county of Gottenborg and Bohus and Kingdom of Sweden, have invented new and useful Improvements in and Relating to Apparatus for the Removal of Rust, of which the following is a specification.

This invention relates to such mechanical apparatus for removing rust or the like which are provided with pivotally journalled chipping members which by means of the centrifugal force created by the rotation of the tool are caused to exert a hammering action upon the object to be treated.

The invention has for its object to provide a rust-removing apparatus of this type in the operation of which the injurious action upon the tool caused by the reactions upon the chipping members is reduced to a minimum and as a consequence the durability of the tool is considerably increased.

According to the invention the chipping members comprise double-armed levers pivotally mounted upon a rotary shaft such that the two lever arms of each chipping member have their centers of gravity disposed on the same or substantially the same straight line which passes through the centre of rotation of the said chipping member, whereby the one lever arm forms the chipping implement proper, while the other lever arm has for its object to serve as a counter-weight to partially counterbalance the first-mentioned lever arm.

In the accompanying drawings some embodiments of the invention are illustrated, wherein:—

Figure 1:
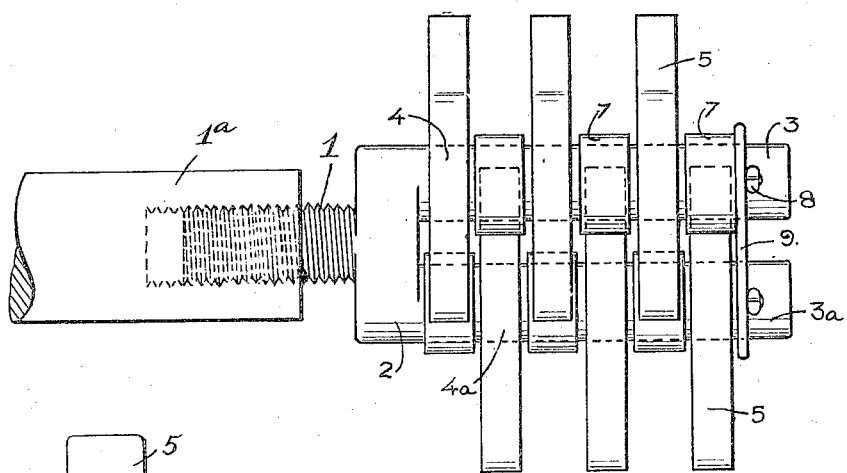
Figure 2:
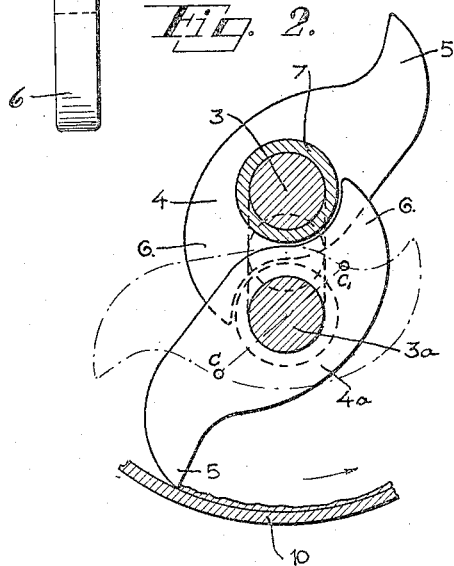

Figure 1 shows a side elevation;

Figure 2 a section view, and

Figure 4:
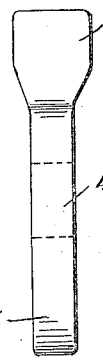
Figure 3:
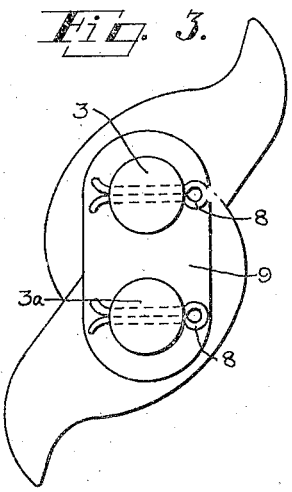

Figure 3 an end elevation of the improved device;

Figure 4 shows a modified design of chipping member.

In the drawing the apparatus is illustrated in working position.

Referring to Figures 1 to 3 of the drawings, 1 denotes a threaded pin by means of which the tool can be fastened to a mechanically driven shaft $1^a$. To the pin 1 there is fastened a crosspiece 2, from which two mutually parallel pins 3 and $3^a$ project disposed on opposite sides of the center line of the pin 1 and extending parallel with the latter. On these pins 3, $3^a$ the chipping members 4 and $4^a$ respectively are pivotally suspended. According to the present invention each chipping member is designed as a double-armed lever, both arms 5 and 6 of which have their centers of gravity C and $C_1$ respectively disposed on the same or practically the same straight line, which passes through the center line of the pins 3, $3^a$ respectively, whereby one arm 5 forms the operative implement of the chipping member while the other arm 6 has for its object to counterbalance the arm 5 such that the center of gravity of the entire chipping member is disposed at a comparatively short distance from the center of rotation of the chipping member about the pins 3, $3^a$ respectively on the side of said pins, toward the operative arm 5. As clearly shown in Figure 1, the chipping members are mounted alternately on the pins 3, $3^a$ in such a way that the arm 6 of the chipping member 4 on the pin 3 is disposed between the arms 6 of two chipping members $4^a$ on the other pin $3^a$. By this arrangement the chipping members receive a very effective lateral guide, which considerably increases their operative durability.

The arms 6 of the chipping members have such a size and shape, and the pins 3, $3^a$ are disposed at such a distance that the chipping members mounted upon either pin 3 or $3^a$ are caused by the rapid rotation of the tool in the direction indicated by the arrow in Figure 2 and the influence of the centrifugal force to bear against the opposite pin $3^a$ or 3 respectively by their arms 6. By this feature the chipping members are prevented from assuming a position depending upon the centrifugal force only, but the straight line imagined to connect the centers of gravity C and $C_1$ respectively of the arms 5, 6 is caused always to assume a certain angle to the direction of the centrifugal force. Interspacing washers 7 of rubber, leather or other soft material are advantageously provided on the pins 3, $3^a$ between the chipping members, so that the arms 5 of the chipping members on the one pin will bear against the yielding washers on the opposite pin instead of against the hard pin proper.

The operative ends of the chipping members, as shown by Figure 2 and 3, are beaked with the point turned in the direction in which the tool is to be revolved. According to Figure 1 the chipping members have the same width along their entire length, while in the embodiment shown in Figure 4 the operative end 5 is flattened out or otherwise widened laterally for the purpose of increasing the range of operation of the chipping member. The chipping members are prevented from displacement along the pins 3, 3ª by means of a plate 9 fastened to the pins 3, 3ª by split pins 8, by the removal of which the chipping members, as well as the interspacing washers 7, can be easily removed from and applied to the tool.

In use, the tool is rapidly rotated in the direction indicated by the arrow in Figure 2. By the centrifugal force the chipping members will assume a position shown in the drawing with their arms 6 resting against the yielding washers 7 and the arms 5 directed outwardly. When striking against the object 10 under treatment the chipping members are caused by the reaction effect to swing back about their pins 3, 3ª respectively, as shown by dotted lines in Figure 2. The centrifugal force then makes the chipping members again swing out into the operative position shown by the full lines. On account of the counter-weight of the arm 6 the striking end 5 of the chipping member is prevented from being slung back too violently, and thus the tool will be saved. The arms 6 when co-operating with the washers 7 simultaneously limit the angle of displacement of the chipping members upon the pin 3 or 3ª respectively, so that the chipping members assume the most suitable angular operative position.

What I claim is:

1. In an apparatus for the removal of rust and the like, a rotatable shaft, chipping members pivotally journaled on said shaft, so as to be adapted to be swung out by the influence of the centrifugal force for exerting a hammering action against the object under treatment, each of said chipping members comprising a double-armed lever, the centers of gravity of said arms disposed such that the straight line, which joins the two centers of gravity passes substantially through the pivoting centre of the chipping member, one of said arms constituting the chipping member proper, and the other of said arms provided to substantially counterbalance the first mentioned arm, and means cooperating with said counterbalancing arm so as to limit the angle of displacement of the chipping member to an angular position suitable for the operation of said member.

2. In an apparatus for the removal of rust and the like, a rotatable shaft, two parallel pins projecting from said shaft and disposed excentrically thereto, chipping members pivotally suspended on each of said pins, each of said members comprising a double-armed lever, one arm of which constitutes the chipping member proper and the other arm provided to substantially counterbalance said first mentioned arm, and the counterbalancing arm of a chipping member on one of said pins disposed between the counterbalancing arms of two chipping members on the opposite pin.

3. In an apparatus for the removal of rust and the like, a rotatable shaft, two parallel pins projecting from said shaft and disposed excentrically thereto, chipping members pivotally suspended on each of said pins, each of said members comprising a double-armed lever, one arm of which constitutes the chipping member proper and the other arm provided to substantially counterbalance said first mentioned arm, and the counterbalancing arms of the chipping members provided to bear against the opposite pin by the action of the centrifugal force in the rapid rotation of said shaft.

4. In an apparatus for the removal of rust and the like, a rotatable shaft, two parallel pins projecting from said shaft and disposed excentrically thereto, chipping members pivotally suspended on each of said pins, each of said members comprising a double-armed lever, one arm of which constitutes the chipping member proper and the other arm provided to substantially counterbalance said first mentioned arm, the counterbalancing arm provided to bear against the opposite pin by the action of the centrifugal force during the rapid rotation of said shaft, and the chipping members designed such, that the straight line which connects the centers of gravity of the two arms of the chipping members forms an angle to the direction of the centrifugal force.

5. In an apparatus for the removal of rust and the like, a rotatable shaft, two parallel pins projecting from said shaft and disposed excentrically thereto, chipping members pivotally suspended on each of said pins, each of said members comprising a double-armed lever, one arm of which constitutes the chipping member proper and the other arm provided to substantially counterbalance said first mentioned arm, and interspacing members on each of said pins provided to receive the counterbalancing arms of the chipping members on the oposite pin.

6. In an apparatus for the removal of rust and the like, a rotatable shaft, chipping members pivotally journaled on said shaft, so as to be adapted to be swung out by the influence of the centrifugal force for exerting a hammering action against the object under treatment, each of said chipping members comprising a double-armed lever, the centers of gravity of said arms disposed such that the straight line, which conjuncts the two centers of gravity passes substantially through the pivoting centre of the chipping member, one of said arms provided as the chipping member proper and having the operative end widened laterally, and the other of said arms provided to substantially counterbalance said first mentioned arm.

In testimony whereof I have affixed my signature.

GIDEON EFRAIM SANDBLOM.

Witnesses:
 JOEN TIBERT,
 GUMIAR BACKER.